United States Patent
Cavaliere (10) Patent No.: US 8,934,788 B2
(45) Date of Patent: Jan. 13, 2015

(54) OPTICAL APPARATUS

(75) Inventor: Fabio Cavaliere, Vecchiano (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 750 days.

(21) Appl. No.: 12/997,596

(22) PCT Filed: Jun. 30, 2008

(86) PCT No.: PCT/EP2008/058365
§ 371 (c)(1),
(2), (4) Date: Feb. 27, 2011

(87) PCT Pub. No.: WO2010/000296
PCT Pub. Date: Jan. 7, 2010

(65) Prior Publication Data
US 2011/0182578 A1    Jul. 28, 2011

(51) Int. Cl.
*H04B 10/12* (2006.01)
*H04B 10/2587* (2013.01)

(52) U.S. Cl.
CPC ................... *H04B 10/2587* (2013.01)
USPC ........................................ 398/201; 398/183

(58) Field of Classification Search
CPC .................................................. H04B 10/5165
USPC ........................................................ 398/201
See application file for complete search history.

(56) References Cited

U.S. PATENT DOCUMENTS

| 5,572,612 | A * | 11/1996 | Delavaux et al. | 385/24 |
| 6,549,319 | B2 * | 4/2003 | Mahlab | 359/238 |
| 6,556,326 | B2 * | 4/2003 | Bergano | 398/183 |
| 6,970,653 | B1 | 11/2005 | Dudley | |
| 7,137,569 | B1 * | 11/2006 | Miller et al. | 239/8 |
| 7,317,569 | B2 * | 1/2008 | Kawanishi | 359/326 |
| 7,773,883 | B1 * | 8/2010 | Weng et al. | 398/83 |
| 8,260,149 | B2 * | 9/2012 | Arahira | 398/189 |
| 8,301,034 | B2 * | 10/2012 | Chen et al. | 398/183 |
| 2002/0041422 | A1 | 4/2002 | Mahlab | |

(Continued)

FOREIGN PATENT DOCUMENTS

| CN | 1366393 A | 8/2002 |
| EP | 0 615 358 A1 | 9/1994 |

(Continued)

OTHER PUBLICATIONS

PCT International Search Report, mailed Mar. 13, 2009, in connection with International Application No. PCT/EP2008/058365.

(Continued)

*Primary Examiner* — Ken Vanderpuye
*Assistant Examiner* — Amritbir Sandhu
(74) *Attorney, Agent, or Firm* — Leffler Intellectual Property Law, PLLC (57) ABSTRACT

An optical apparatus for use in an optical communications network, and a method of operating a network are described. The apparatus includes an input suitable for receiving a first continuous wave optical signal from a remote location on a network, and a modifying unit arranged to modify the first continuous wave optical signal to produce a second continuous wave optical signal having a wavelength which is different from the wavelength of the first continuous wave optical signal. A modulating unit is arranged to modulate the second continuous wave optical signal with data to produce a modulated second continuous wave optical signal.

18 Claims, 4 Drawing Sheets

(56) References Cited

U.S. PATENT DOCUMENTS

| | | | |
|---|---|---|---|
| 2002/0149826 A1* | 10/2002 | Tanaka et al. | 359/181 |
| 2002/0191260 A1* | 12/2002 | Bergano | 359/181 |
| 2003/0063855 A1* | 4/2003 | Spaelter | 385/37 |
| 2005/0265730 A1* | 12/2005 | Yasue et al. | 398/183 |
| 2005/0271393 A1* | 12/2005 | Gnauck et al. | 398/186 |
| 2008/0193143 A1* | 8/2008 | Mahgerefteh et al. | 398/183 |
| 2010/0329679 A1* | 12/2010 | Little et al. | 398/79 |
| 2011/0182578 A1* | 7/2011 | Cavaliere | 398/58 |
| 2011/0182584 A1* | 7/2011 | Gottwald et al. | 398/79 |
| 2011/0206376 A1* | 8/2011 | Gottwald et al. | 398/76 |

FOREIGN PATENT DOCUMENTS

| | | | |
|---|---|---|---|
| EP | 615358 A1 * | 9/1994 | |
| EP | 0 717 516 A1 | 6/1996 | |
| EP | 0 615 358 B1 | 10/2004 | |
| FR | 2 896 932 A | 8/2007 | |

OTHER PUBLICATIONS

Marxer, C. et al. "Reflective Duplexer Based on Silicon Micromechanics for Fiber-Optic Communication" Journal of Lightwave Technology, IEEE Service Center, New York, NY, US. vol. 17, No. 1, Jan. 1, 1999, XP011029323, ISSN: 0733-8724.

Chinese First Search Report, dated Jul. 1, 2013, in connection with counterpart Chinese Patent Application No. 20088013028.9, all pages (see translation below).

Translation of Chinese First Search Report, dated Jul. 1, 2013, in connection with counterpart Chinese Patent Application No. 20088013028.9, all pages.

* cited by examiner

OPTICAL APPARATUS

TECHNICAL FIELD

This invention relates to improvements in optical apparatus for use in an optical communication networks.

BACKGROUND

In an optical network, such as a Passive Optical access Network, each user is provided with their own optical apparatus. Information is sent to each user's optical apparatus from a piece of equipment on the network such as an optical line terminal OLT. The OLT may be connected to each user's apparatus through a single fibre and an optical distribution node, which is typically a passive splitter in a conventional Passive optical network (PON) or a wavelength selective splitter in a wavelength division multiplexing (WDM) PON. The role of the user's optical apparatus is to send an optical signal—which the user can modulate with data—across the network for transmission to other equipment on the network. It will typically send that information to a central office. The user apparatus may also function to read optical information sent to it from the network. This enables the user to send and receive data optically across the network. In the case of an International Telecommunications (ITU) standard WDM network the user's optical apparatus may form part of an item of equipment that is sometimes referred to as an optical network terminal (ONT).

Wavelength division multiplexing is a very promising technology for optical communications networks due to the effective use of the network fibres. Relatively high upstream and downstream bandwidth can be provided compared with time division multiplexing. Wavelength multiplexing allows a single fibre to exit the central office carrying a plurality of different wavelength optical signals with the signals being subsequently split by a wavelength selective splitter for transmission along 4, 8, 16, 32, 40, 64 or 80 fibres, which are each connected to a respective item of user optical apparatus near the end of the communication path. In a WDM PON, different users are associated with different wavelengths.

Several standards exist for WDM transport networks, an example of a standard for a WDM-PON transport network being the 50 GHz ITU-T grid standard. Data carrying signals are transmitted upstream and downstream by the central office by modulating a set of continuous wave carrier signals which are spaced at intervals of 50 GHz. Each signal is allocated uniquely to a user's optical apparatus.

A WDM PON requires each user to transmit information to the network on a different wavelength. Unfortunately, this means that, historically, the optical apparatus provided for each user at their optical network termination has to be slightly different from that of each other user to enable the apparatus to transmit a signal at its unique allocated wavelength. In practice this means that each piece of user optical apparatus has to include unique and/or complex componentry, making production costs high. In the case of access networks, and in particular passive optical networks, in which a single fibre is used to carry data to each user, cost is a key driver.

SUMMARY

According to a first aspect the invention provides an optical apparatus for use in an optical communications network. The apparatus comprises an input which is suitable for receiving a first continuous wave optical signal from a remote location on a network, and a modifying unit arranged to modify the first continuous wave optical signal to produce a second continuous wave optical signal having a wavelength which is different from the wavelength of the first continuous wave optical signal. A modulating unit is arranged to modulate the second continuous wave optical signal with a data signal to produce a modulated second continuous wave optical signal.

By producing a second continuous wave (CW) optical signal having a predefined wavelength from a first CW optical signal received from the network which has a different wavelength, and then modulating the second CW optical signal with data (e.g. before sending the modulated signal across the network), it is possible to send the data signal back along the same fibre that the first CW signal was received from without cross talk. Further, the colour (i.e. the wavelength of the second CW optical signal) of the optical apparatus can be set by choosing the wavelength of the first CW optical signal. Making the optical apparatus colorless in this way, with the color or wavelength being set by the first CW optical signal supplied to the optical apparatus across the network, means many substantially identical apparatuses may be provided on a single WDM network, reducing costs compared with prior apparatus that are coloured (have a predefined wavelength of operation defined by the apparatus).

The modifying unit may comprise a first modulator and a signal generator adapted to generate a continuous wave modulating signal, the first modulator being adapted to modulate the first continuous wave optical signal with the continuous wave modulating signal.

The modulator may be adapted to amplitude modulate said first CW signal with the CW modulating signal to produce a set of at least three intermediate signals: a first intermediate signal having the same wavelength as the first continuous wave optical signal and two further intermediate signals which comprise sidebands of the first intermediate signal and are each spaced on a respective side of the first intermediate signal in the optical spectrum by an amount equal to the wavelength of the modulating signal. This modification produces for the first time in the ONT the wavelength of the desired second CW signal.

The first modulator may be arranged to be polarisation insensitive and may also be arranged to work over the entire range of possible wavelengths that belong to the network grid. This last feature is useful because it allows the same optical apparatus to be given to any user whilst allowing a lot of freedom in the choice of wavelength of first CW optical signal that it is supplied with.

The modulating signal may be a radio frequency (RF) signal. The modulating signal may have a wavelength equal to half of the spacing between adjacent data carrying wavelengths compatible with the network to which the apparatus is to be connected. For example, it may comprise a 25 GHz tone when the apparatus is intended to be used on a 50 GHz ITU grid.

The modifying unit may also include a first filter which removes from the output of the modulator the wavelength of the first CW optical signal to leave the two sidebands. This can be the first stage in a filtering process which separates out the sidebands from the original first CW wavelength.

The filter may be arranged to work over the entire range of optical wavelengths that belong to the network/ are on a wavelength grid assigned to the network. This can be achieved using a tunable filter or a periodic filter. The latter is preferred as it requires no modification for the apparatus to work at any wavelength that may be supplied to the user.

The first filter may comprise a first optical de-interleaver. The first optical de-interleaver may be configured to deinterleave an input comb that comprises wavelengths that are twice the distance apart in the optical spectrum that the first CW signal is spaced apart from the desired second CW signal wavelength. In the case of the 50 GHz grid with a first CW signal 25 GHz from the grid the first deinterleaver should deinterleave a 50 GHz comb. The result will be two wavelength output signal—one containing the first CW signal and the other the sidebands. The first CW signal can thus be effectively filtered out from the sidebands. The ONT may drop the output signal containing the first CW signal.

The modifying unit may further include a second filter which is arranged to receive the output from the first filter and is configured to remove one of the two sidebands to leave a single continuous wave signal which forms the second CW signal that is modulated by the data signal and is at the wavelength of one of the sidebands. This second filtering stage picks out one of the sidebands and rejects the other.

As with the first filter, the second filter may be arranged to work over any of the wavelengths that belong to the network. A tunable filter or a periodic filter may be used.

The second filter may comprise an optical de-interleaver. The use of the deinterleavers is preferred because it is possible to preserve the polarisation of the first CW signal in forming the second CW signal.

The modulating means may comprise a modulator, such as an electro absorption modulator (EAM) which receives the second wave CW and is amplitude modulated by the data signal to provide at its output the modulated second CW signal.

The input of the optical apparatus may include an optical circulator which receives the first CW optical signal and the modulated second CW optical signal which it sends back along the fibre from which the first CW signal was received. It could, of course, pass it onto the network along a different fibre if preferred.

The apparatus may include one or more amplifiers arranged to amplify the signals at various points in the apparatus as may be required. The amplifier(s) may each comprise semiconductor optical amplifier(s). Such amplifiers can be readily configured to provide some pre-amplification to the optical signals whilst preserving polarity.

The apparatus may be arranged so that it is insensitive to the polarisation of the incoming first continuous wave optical signal.

According to a second aspect the invention provides an optical communication system comprising an optical network, and optical apparatus according to the first aspect of the invention connected to the network. An optical source can be located at a remote point on the optical network from the optical apparatus. The ource can be arranged to produce a first continuous wave optical signal that is transmitted to the optical apparatus.

The optical apparatus and the optical source may in some arrangements together be considered to part of a single, distributed, optical apparatus—one part of which is at the users location and the other part (the source) remotely located from that.

The optical source may be located at an optical line terminal (OLT) or a central office (CO) of the network.

The system may include at least one optical fibre connecting the optical CW source and the optical apparatus, the first CW optical signal being sent along the fibre and the modulated signal being sent back along the same fibre across the network. Using a single fibre for both upstream and downstream signals in this way is possible because the signals are at different wavelengths so do not generate cross talk.

The optical source may generate a first CW optical signal which has a wavelength that is offset from a data carrying wavelength of the network, preferably by half of the spacing between allowable adjacent wavelengths. For example, where the combination defines a 50 GHz ITU grid the first CW signal may be offset from one of the wavelengths belonging to that grid, preferably by 25 GHz. The tone signal may be produced which is equal to this offset.

The system may include more than one optical apparatus according to the first aspect of the invention and the optical source may produce more than one CW optical signal, each of a different wavelength and each offset from a wavelength belonging to the grid of the network. Of course multiple optical sources could be provided as an alternative.

The combination may therefore form a 50 GHz ITU-grid.

According to a still further aspect the invention provides a method of operating an optical communication network of the kind comprising at least one item of optical apparatus associated with a user of the network which is arranged to transmit user data across the network. The method comprises generating a first continuous wave optical signal at a first point in the network remote from the optical apparatus and transmitting the first continuous wave optical signal across the network to the optical apparatus. The first continuous wave optical signal is received at the optical apparatus, modifying the first continuous wave optical signal to produce a second continuous wave optical signal whose wavelength is different from the first continuous wave optical signal. The second continuous wave optical signal is modulated with a data signal to produce a modulated second continuous wave optical signal and the modulated second continuous wave optical signal transmitted across the network.

The method may transmit the first CW optical signal and the modulated second CW optical signal over the same part of the network. Typically the network will comprise optical fibres. A single fibre may carry the downstream first CW optical signal and the corresponding upstream modulated second CW optical signal.

The method may comprise transmitting a plurality of first CW optical signals across the network, each at a wavelength which comprises a base wavelength and a unique multiple of 50 GHz.

The method may comprise producing at the user apparatus a second CW signal that differs from the first CW optical signal by around half the spacing between the first CW optical signals.

BRIEF DESCRIPTION OF THE DRAWINGS

There will now be described, by way of example only, one embodiment of the present invention with reference to and as illustrated in the accompanying drawings of which.

DETAILED DESCRIPTION

Figure 1:
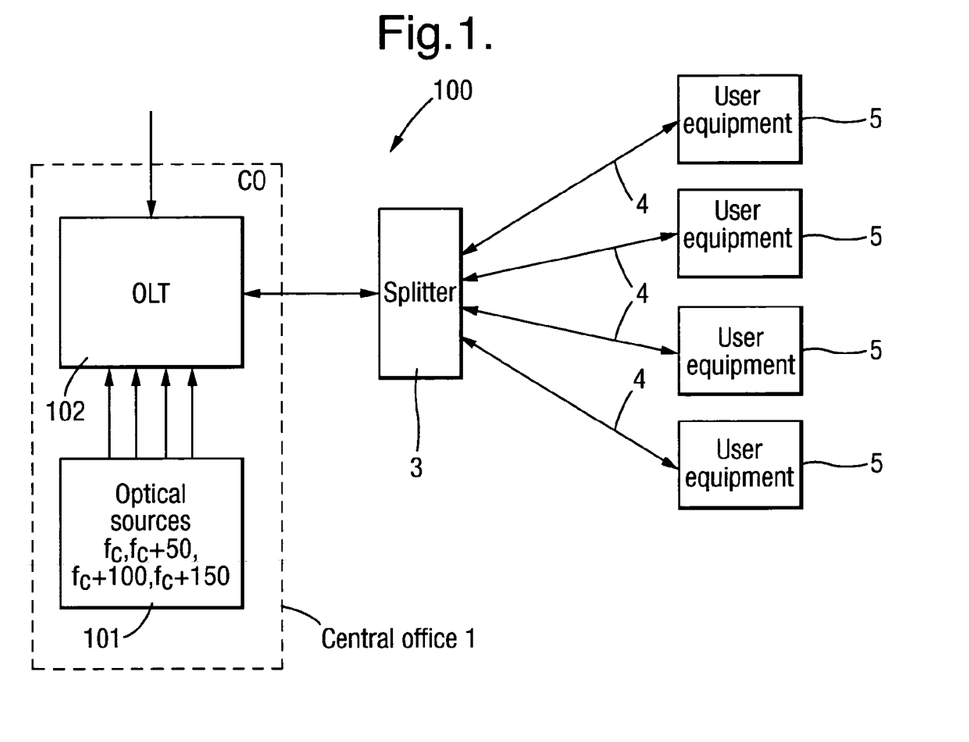
FIG. 1 is an illustration of a four user optical communications network compatible with the 50 GHz ITU grid standard for DWDM passive optical networks, in accordance with an embodiment of the invention.

In FIG. 1, a four user optical communication access network which operates in accordance with the 50 GHz ITU-grid standard is shown. Embodiment of the invention may, of course, have application to other kinds of optical network or in accordance with other standards that define operating wavelength, but it is envisaged that in at least this arrangement it may have application to a 50 GHz network.

The network 100 comprises a central office (CO) and an optical line terminal (OLT) 102. The OLT 102 is connected through a single optical fibre 2 to a passive splitter 3. The splitter 3 connects the fibre 2 to a set of fibres 4 (here, four fibre, although more could be provided). Each of the fibres 4 is connected to a respective optical apparatus 5. Each apparatus 5 is associated with a respective user. Typically the optical apparatus will be located at the users premises or close to their premises. In the case of ITU-grid networks each optical apparatus may form part or all of an optical network terminal (ONT). The role of the optical apparatus 5 is to enable the user to transmit data onto the network fibre. The apparatus 5 may also function to take data off the network which is sent to the user.

The network 100 operates in accordance with the 50 GHz ITU-grid standard, with each of the optical apparatus 5 sending information across the network on a different wavelength from the other optical apparatus. In the example, the set of wavelengths are spaced from a base wavelength by a multiple of 50 GHz and as such each wavelength belongs to the 50 GHz ITU-T grid.

Figure 2:
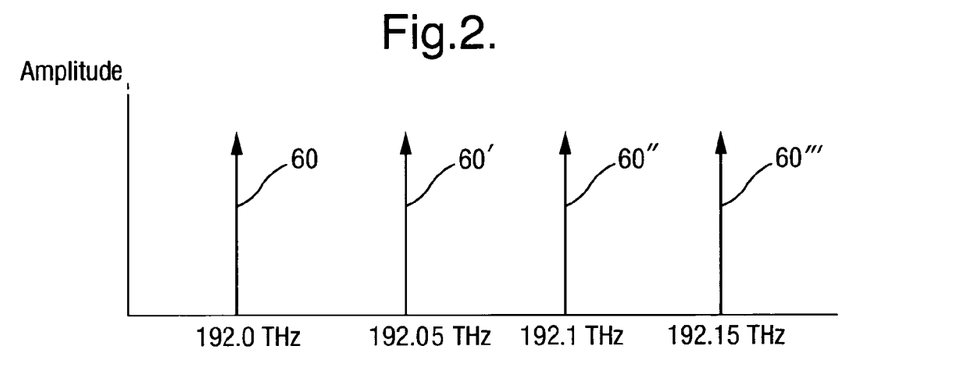
FIG. 2 is an illustration of the four wavelengths used by the user optical apparatus on the network of FIG. 1.

FIG. 2 shows four typical wavelengths of data carrying CW signals that may be emitted from the four optical apparatus 5. These four wavelengths may be 192.00 THz, 192.05 THz, 192.10 THz and 192.15 THz. Of course a different set of four wavelengths could be used to suit the network. Because each user sends and receives data on a unique wavelength belonging to the grid the system is said to employ wavelength division multiplexing (WDM).

The OLT is provided with a set of optical sources, each one being associated with a user's optical apparatus 5 and emitting optical signals at a wavelength that is unique to each optical apparatus. Alternatively a single source transmitting multiple wavelengths could be provided. Preferably only a single wavelength signal is received by each apparatus 5. There may be some filtering at the splitter 3 or after the splitter 3 to ensure that only the correct wavelength signal 40 reaches each apparatus 5. Equally, the splitter may be a demultiplexer. The wavelength of the optical signal that each optical apparatus 5 sends back across the network is dependent upon the wavelength of the signal sent to that optical apparatus 5.

Figure 6:
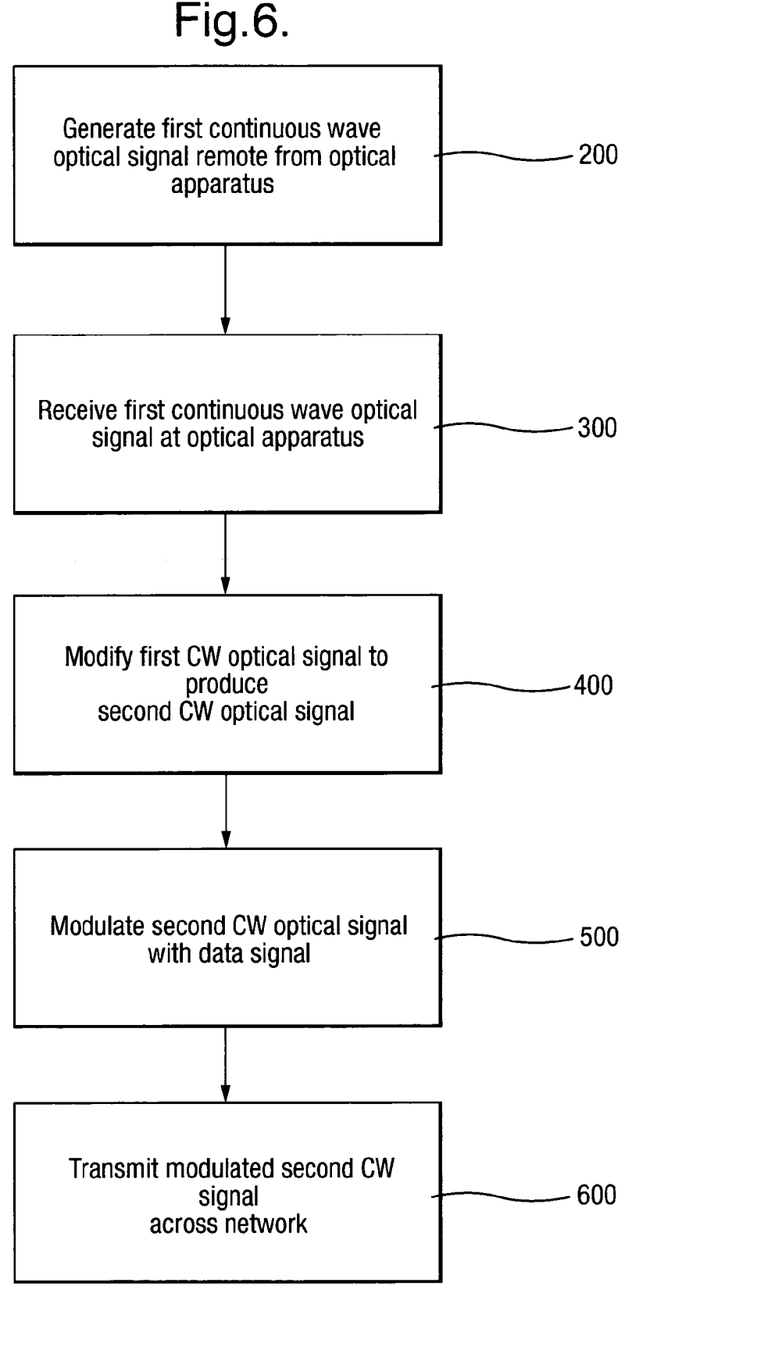
FIG. 6 is a flowchart illustrating the steps performed by the apparatus of FIG. 4 in implementing a method of operating the apparatus for use on the network of FIG. 1.

The operation of the network is summarised in the flow chart of FIG. 6. In the preferred embodiment the source generates 200 a first continuous wave signal 40 at a predetermined wavelength. Preferably the wavelength is at a wavelength 25 GHz spaced from the wavelength allocated to the optical apparatus. The optical apparatus 5 receives 300 this signal and modifies 400 this signal to produce a second continuous wave optical signal 50 which has been shifted to a different wavelength that corresponds to its allocated wavelength. The apparatus 5 modulates 500 the second continuous wave optical signal 50 with data from a data signal before sending the modulated signal 60 back to the OLT. The data signal can be any information carrying signal, and the data can be any information. The second CW optical signal 50 can be modulated with the data of the data signal in accordance with any modulation technique suitable for optical transmission.

Figure 3:
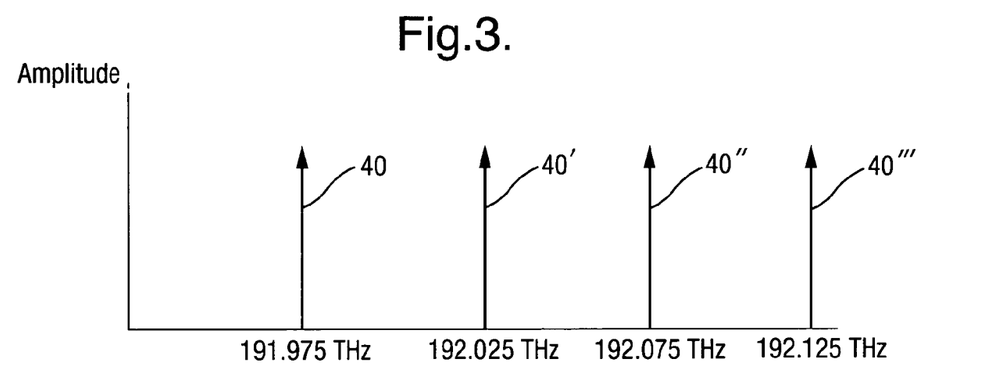
FIG. 3 is an illustration of the four wavelengths sent from the OLT in the network of FIG. 1 with each one offset from the wavelengths belonging to the grid.

FIG. 3 shows how the four first continuous wave optical signals 40, 40', 40" and 40'" (which are transmitted downstream to the apparatus 5), each at different wavelengths, interleave with the four modulated data signal wavelengths 60, 60', 60" and 60'" produced by the four optical apparatus 5 (these wavelengths being used for upstream transmission along at least some of the same fibre as the downstream signals). As none of the wavelengths overlap there is no cross talk. Because the OLT is provided with the optical source that defines the wavelengths of each optical apparatus 5, the optical apparatus 5 can be considered to be colourless and could therefore be identical. This makes it easy to set up the system and add new users because they can all have identical optical apparatus. Further, manufacturing costs of the apparatus 5 can be relatively low.

Figure 4:
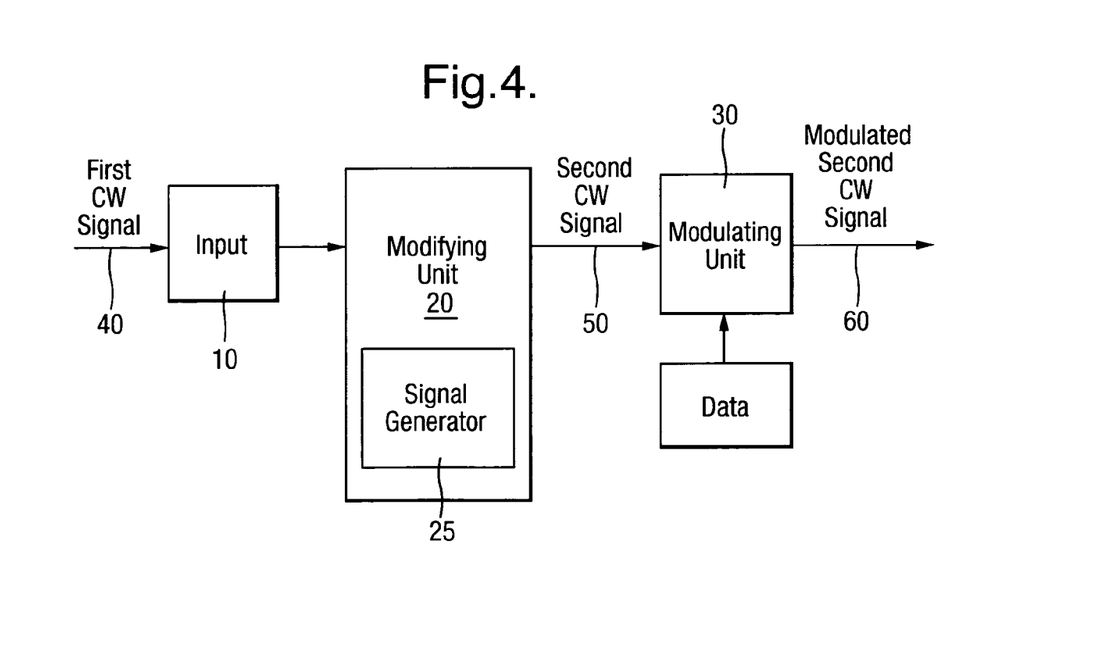
FIG. 4 is a simplified schematic illustration of the components of one of the user optical apparatus in the network of FIG. 1 (the others being identical) in accordance with an embodiment of the invention.

The optical apparatus 5 of one user is shown schematically in FIG. 4 of the accompanying drawings and represents an embodiment that falls within the scope of the first aspect of the invention. This optical apparatus 5, together with its associated source at the OLT, is an embodiment within the second aspect of the invention. A simplified schematic of an optical apparatus 5 is shown in FIG. 4 to aid in understanding of the specific arrangement of FIG. 5.

The optical apparatus 5 comprises four stages: an input 10, a modifying unit 20 including a signal generator 25 and a modulating unit 30. The signal generator 25 is arranged to generate a modulating signal 80. The signal 80 can be a RF (radio frequency) signal. The input receives a first CW optical signal 40 sent to the apparatus from the network source and passes it to the modifying unit 20. This unit 20 works, without using any internal optical sources, to alter the wavelength of the received first CW optical signal 40 to produce a second CW optical signal 50 of different wavelength e.g. by appropriate modulation of the signal 40 using the modulating signal 80. Appropriate modulation techniques include amplitude modulation and SSB (single side band) modulation. The received first CW optical signal 40 is preferably sent at a wavelength that is not on the network transmission wavelength grid and is preferably modified to produce a second CW optical signal 50 which is on the wavelength grid e.g. the 50 GHz spaced grid. This second CW optical signal 50 is then passed to the modulating unit 30 which modulates the signal 50 with data before it is sent across the network.

One example, in accordance with the first aspect of the present invention, of an optical apparatus allocated to a user for use on the network of FIG. 1 is shown in FIG. 4. The optical apparatus 5 comprises an optical circulator 10 at its input, which receives the first CW optical signal 40 associated with that user optical apparatus from the central office 1 and passes the signal 40 to the modifying unit 20. The modifying unit 20 comprises an optical pre-amplifier 24 and a modulator 21. The pre-amplifier 24 here is a semiconductor optical amplifier (SOA) which can power amplify the signal 40 and ensure that the polarity of the first CW optical signal 40 is preserved. The signal 40 is passed to the modulator 21, which in this embodiment is an electroabsorption modulator (EAM) 21. The apparatus 5 also includes a pulse tone generator 25 which generates a 25 GHz RF continuous wave signal 80 that is used to modulate the first CW optical signal 40 as it passes through the EAM 21. The result of this is that the output of the EAM 21 comprises a signal at the same wavelength as the first CW signal 40 and two further intermediate signals formed by the two sidebands in the optical spectrum, each 25 GHz apart from the first CW optical signal 40. One will be 25 GHz further up the spectrum and the other 25 GHz down. Both of these wavelengths will typically belong to the 50 GHz grid. If desired each of these sideband signals could be modulated using a data signal, with both resulting modulated signals transmitted back upstream carrying information from the apparatus 5. However, in this particular embodiment, only one of the sideband signals is used for upstream transmission, and the other sideband signal is filtered out (as will now be described).

Figure 5:
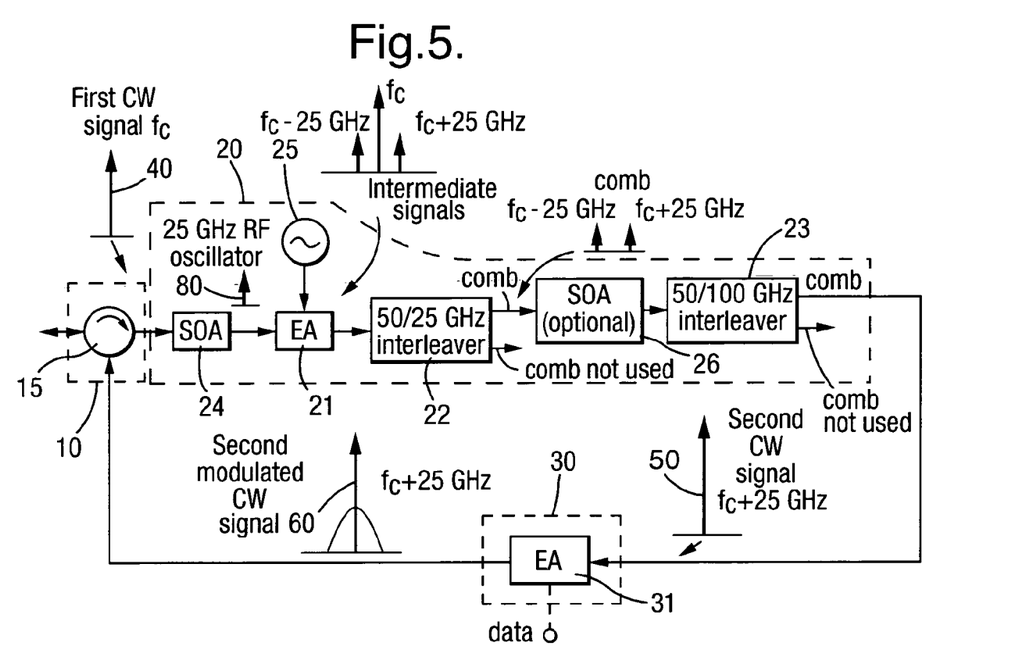
FIG. 5 is a detailed schematic of an embodiment of the user optical apparatus of FIG. 4 for use with an optical network.

The output of the EAM 21 is fed to the input of an optical deinterleaver 22. As shown in FIG. 5 this may be an interleaver connected in reverse. This is a device for dividing a comb of input signals 25 GHz apart (i.e. a signal consisting of a set of signals, with each signal spaced 25 GHz from adjacent signals) into two output signals of combs of frequencies that are 50 GHz apart. In this case, the input comb comprises the two sidebands and the signal at the initial CW signal wavelength. One output signal will contain the first CW signal, and the other output signal will contain the two intermediate-signals i.e. the two sidebands. The output signal containing the wavelength of the original CW signal is dropped, and the output signal that contains the two sidebands retained for onward processing.

The signal containing the two sidebands is then fed to an (optional) further amplifier 26 (here, in the form of another SOA). The signal containing the two sidebands is then passed to the input of another de-interleaver 23. This deinterleaver 23 is a device that splits an input comb of 50 GHz apart signals into two combs of signals that are 100 GHz spaced. The output of this second deinterleaver 23 is therefore two signals, one containing one of the intermediate signals formed by a sideband and the other containing the other intermediate signal formed by the other sideband. One of these signals is dropped leaving only a single CW signal 50 at a wavelength that is on the wavelength grid of the network.

The single CW signal 50 is then passed to the modulating unit 30 where it is modulated with data of a data signal by a modulator. In this embodiment the modulating unit 30 comprises an EAM 31 for amplitude modulating the signals 50. The resulting modulated signal 60 is then sent back upstream. In particular, the signal 60 is passed to the circulator 10, for coupling back onto the same fibre that the first CW optical signal 40 was received from.

One of the potential advantages of the optical apparatus 5 shown in FIG. 4 is that the polarisation of the incoming first CW optical signal 40 is not critical to the operation of the apparatus 5. It is also relatively inexpensive to implement, as the optical source is located remote from the apparatus 5 and the apparatus 5 is colourless. This allows many identical apparatus 5 to be deployed across the network.

It will be readily appreciated that several modifications are possible within the scope of the invention. Firstly, whilst the embodiment works for a 50 GHz ITU-grid, it could also work for other wavelengths. For any wavelength grid, the first CW optical signal can be generated at the OLT to be a predetermined offset from the grid wavelengths, with the RF modulating signal matched to the predetermined offset, with the first deinterleaver being suitable for deinterleaving comb signals with spacing equal to twice the offset, and the second de-interleave being suitable for deinterleaving combs at four times the offset.

Although the de-interleavers used here are comb filters, in practice each apparatus 5 could contain any appropriate filter or filter system to replace the comb filters. Each such filter or filtering system can be arranged to filter out the downstream signal 40 from the second CW signal 50. However, the advantage of using comb filter de-interleavers is that the apparatus 5 can be colourless.

The invention claimed is:

1. An optical apparatus for use in an optical communications network, the apparatus comprising:
   an input which is suitable for receiving a first continuous wave optical signal from a remote location on a network;
   a modifying unit arranged to modify the first continuous wave optical signal to produce a second continuous wave optical signal having a wavelength which is different from the wavelength of the first continuous wave optical signal; and
   a modulating unit arranged to modulate the second continuous wave optical signal with data to produce a modulated second continuous wave optical signal,
   wherein:
   the modifying unit comprises a first modulator and a signal generator adapted to generate a continuous wave modulating signal, the first modulator being adapted to modulate the first continuous wave optical signal with the continuous wave modulating signal; and
   the first modulator is adapted to amplitude modulate the first continuous wave optical signal with the continuous wave modulating signal to produce a set of at least three intermediate signals; a first intermediate signal having the same wavelength as the first continuous wave optical signal and two further intermediate signals which comprise sidebands of the first intermediate signal and are each spaced on a respective side of the first intermediate signal in the optical spectrum by an amount equal to the wavelength of the modulating signal.

2. An optical apparatus according to claim 1 in which the first modulator comprises an electro-absorption modulator.

3. An optical apparatus according to claim 1 in which the continuous wave modulating signal has a wavelength equal to half of the spacing between adjacent data carrying wavelengths that belong to the grid of the network to which the apparatus is to be connected.

4. An optical apparatus according to claim 1 in which the modulating signal comprises an RF signal.

5. An optical apparatus according to claim 1 in which the modifying unit also includes a first filter which is adapted to separate out from the set of intermediate signals output from the first modulator the first intermediate signal to leave the two further intermediate signals.

6. An optical apparatus according to claim 5 in which the first filter comprises a first optical de-interleaver configured to de-interleave the set of intermediate signals from the first modulator to provide two output signals such that one output signal contains the first intermediate signal and the other the further intermediate signals.

7. An optical apparatus according to claim 5 in which the modifying unit includes a second filter which is adapted to receive from the first filter the output signal containing the further intermediate signals and is configured to remove one of the further intermediate signals to leave one further intermediate signal which forms the second continuous wave optical signal.

8. An optical apparatus according to claim 7 in which the second filter comprises a second optical de-interleaver configured to de-interleave the further intermediate signals output from the first filter to produce two further output signals, each further output signal containing a respective one of the further intermediate signals for forming the second continuous wave optical signal.

9. An optical apparatus according to claim 1 in which the modulating unit comprises a second modulator, which is adapted to receive the second continuous wave optical signal and to amplitude modulate that signal by the data signal to provide the modulated second continuous wave optical signal.

10. An optical apparatus according to claim 1 in which the input includes an optical circulator which is adapted to couple the first continuous wave optical signal from the network to the optical apparatus and is also adapted to function as an output by being arranged to couple the modulated second continuous wave optical signal to the network.

11. An optical apparatus according to claim 1 which comprises an optical network terminal arranged so that the modulator modulates the second continuous wave optical signal with data.

12. An optical communication system comprising an optical network, an optical apparatus connected to the network and an optical source located at a remote point on the optical network from the optical apparatus which is arranged to produce a first continuous wave optical signal that is transmitted to the optical apparatus,
wherein the optical apparatus comprises:
an input which is suitable for receiving a first continuous wave optical signal from a remote location on a network;
a modifying unit arranged to modify the first continuous wave optical signal to produce a second continuous wave optical signal having a wavelength which is different from the wavelength of the first continuous wave optical signal; and
a modulating unit arranged to modulate the second continuous wave optical signal with data to produce a modulated second continuous wave optical signal,
wherein:
the modifying unit comprises a first modulator and s signal generator adapted to generate a continuous wave modulating signal, the first modulator being adapted to modulate the first continuous wave optical signal with the continuous wave modulating signal; and
the first modulator is adapted to amplitude modulate the first continuous wave optical signal with the continuous wave modulating signal to produce a set of at least three intermediate signals: a first intermediate signal having the same wavelength as the first continuous wave optical signal and two further intermediate signals which comprise sidebands of the first intermediate signal and are each spaced on a respective side of the first intermediate signal in the optical spectrum by an amount equal to the wavelength of the modulating signal.

13. An optical communication system according to claim 12 in which the optical apparatus comprises an optical network terminal and the source is located at one of an optical line terminal and a central office of the network.

14. An optical communication system according to claim 12 in which an optical fibre is provided between the optical source and the optical apparatus which carries the first continuous wave optical signal and the modulated second continuous wave optical signal in opposing directions.

15. An optical communication system according to claim 12 in which the optical source generates a first continuous wave optical signal which has a wavelength that is offset from a data carrying wavelength belonging to the network.

16. A method of operating an optical communication network of the kind comprising at least one item of optical apparatus associated with a user of the network which is arranged to transmit data across the network, in which the method comprises:
generating a first continuous wave optical signal at a first point in the network remote from the optical apparatus and transmitting the first continuous wave optical signal across the network to the optical apparatus;
receiving the first continuous wave optical signal at the optical apparatus;
modifying the first continuous wave optical signal to produce a second continuous wave optical signal whose wavelength is different from the first continuous wave optical signal;
modulating the second continuous wave optical signal with data to produce a modulated second continuous wave optical signal; and
transmitting the modulated second continuous wave optical signal across the network,
wherein:
modifying the first continuous wave optical signal to produce the second continuous wave optical signal comprises generating a continuous wave modulating signal and modulating the first continuous wave optical signal with the generated continuous wave modulating signal; and
modulating the first continuous wave optical signal with the generated continuous wave modulating signal comprises amplitude modulating the first continuous wave optical signal with the generated continuous wave modulating signal to produce a set of at least three intermediate signals; a first intermediate signal having the same wavelength as the first continuous wave optical signal and two further intermediate signals which comprise sidebands of the first intermediate signal and are each spaced on a respective side of the first intermediate signal in the optical spectrum by an amount equal to the wavelength of the modulating signal.

17. A method according to claim 16 which further comprises transmitting the first continuous wave optical signal and the modulated second continuous wave optical signal over the same part of the network.

18. A method according to claim 16 in which the step of modifying the first continuous wave optical signal comprises passing the first continuous wave optical signal through a modulator followed by two de-interleavers connected in series.

* * * * *

UNITED STATES PATENT AND TRADEMARK OFFICE
CERTIFICATE OF CORRECTION

| | | |
|---|---|---|
| PATENT NO. | : 8,934,788 B2 | Page 1 of 1 |
| APPLICATION NO. | : 12/997596 | |
| DATED | : January 13, 2015 | |
| INVENTOR(S) | : Cavaliere | |

It is certified that error appears in the above-identified patent and that said Letters Patent is hereby corrected as shown below:

On the Title Page

In the Figure, for Tag "21" in Line 1, delete "EA" and insert -- EAM --, therefor.

In the Figure, for Tag "31" in Line 1, delete "EA" and insert -- EAM --, therefor.

In the Drawings

In Fig. 5, Sheet 3 of 4, for Tag "21" in Line 1, delete "EA" and insert -- EAM --, therefor.

In Fig. 5, Sheet 3 of 4, for Tag "31" in Line 1, delete "EA" and insert -- EAM --, therefor.

In the Specification

In Column 3, Line 51, delete "ource" and insert -- source --, therefor.

In the Claims

In Column 8, Line 29, in Claim 1, delete "signals;" and insert -- signals: --, therefor.

In Column 8, Line 55, in Claim 6, delete "other the" and insert -- other --, therefor.

In Column 9, Line 39, in Claim 12, delete "and s" and insert -- and a --, therefor.

In Column 10, Line 41, in Claim 16, delete "signals;" and insert -- signals: --, therefor.

Signed and Sealed this
Eleventh Day of August, 2015

Michelle K. Lee
*Director of the United States Patent and Trademark Office*